(12) United States Patent
Minokuchi et al.

(10) Patent No.: US 12,075,251 B2
(45) Date of Patent: Aug. 27, 2024

(54) NETWORK NODE

(71) Applicant: NTT DOCOMO, INC., Tokyo (JP)

(72) Inventors: Atsushi Minokuchi, Tokyo (JP); Jari Mutikainen, Munich (DE); Riccardo Guerzoni, Munich (DE)

(73) Assignee: NTT DOCOMO, INC., Tokyo (JP)

( * ) Notice: Subject to any disclaimer, the term of this patent is extended or adjusted under 35 U.S.C. 154(b) by 248 days.

(21) Appl. No.: 17/601,246

(22) PCT Filed: Feb. 4, 2020

(86) PCT No.: PCT/JP2020/004063
§ 371 (c)(1),
(2) Date: Oct. 4, 2021

(87) PCT Pub. No.: WO2020/208913
PCT Pub. Date: Oct. 15, 2020

(65) Prior Publication Data
US 2022/0201487 A1   Jun. 23, 2022

(30) Foreign Application Priority Data

Apr. 11, 2019   (JP) .................... 2019-075884

(51) Int. Cl.
*H04W 12/10* (2021.01)
*H04W 12/06* (2021.01)
(Continued)

(52) U.S. Cl.
CPC ........... *H04W 12/10* (2013.01); *H04W 12/06* (2013.01); *H04W 12/08* (2013.01); *H04W 84/042* (2013.01)

(58) Field of Classification Search
CPC ..... H04W 12/10; H04W 12/06; H04W 12/08; H04W 84/042; H04W 88/16;
(Continued)

(56) References Cited

U.S. PATENT DOCUMENTS 10,361,843 B1 *  7/2019  Suthar .................. H04L 9/3257
10,548,004 B2 *  1/2020  Bykampadi ........... H04L 63/166
(Continued)

FOREIGN PATENT DOCUMENTS

EP   3788773 A1   3/2021
JP   2013-526134 A   6/2013
(Continued)

OTHER PUBLICATIONS

Office Action issued in the counterpart Japanese Patent Application No. 2021-513180, mailed on Jun. 27, 2023 (5 pages).
(Continued)

*Primary Examiner* — Don G Zhao
(74) *Attorney, Agent, or Firm* — Osha Bergman Watanabe & Burton LLP

(57) ABSTRACT

A network node includes a receiving unit configured to receive, from a management node, information for improving security of communication between network nodes, and a control unit configured to receive a request transmitted from a first network node arranged in a first PLMN (Public Land Mobile Network) based on the information for improving security, and transmit the request to a second network node arranged in a second PLMN.

3 Claims, 14 Drawing Sheets

(51) Int. Cl.
*H04W 12/08* (2021.01)
*H04W 84/04* (2009.01)

(58) Field of Classification Search
CPC . H04W 12/03; H04W 12/069; H04W 12/084; H04W 8/12; H04W 92/24; H04L 63/0281; H04L 63/0807; H04L 63/166
See application file for complete search history.

(56) References Cited

U.S. PATENT DOCUMENTS

| | | | |
|---|---|---|---|
| 10,826,946 B2* | 11/2020 | Bykampadi | H04L 63/0281 |
| 10,834,571 B1* | 11/2020 | Yau | H04W 12/06 |
| 10,893,025 B2* | 1/2021 | Bykampadi | H04W 88/16 |
| 11,032,569 B2* | 6/2021 | Wang | H04L 65/764 |
| 11,050,788 B2* | 6/2021 | Livanos | H04W 48/16 |
| 11,405,780 B2* | 8/2022 | He | H04L 9/085 |
| 11,468,285 B1* | 10/2022 | Tang | B60W 60/0027 |
| 11,510,052 B2* | 11/2022 | Zhang | H04L 9/30 |
| 11,582,685 B2* | 2/2023 | Martinez De La Cruz | H04W 48/16 |
| 2012/0227114 A1 | 9/2012 | Okuyama et al. | |
| 2013/0028139 A1 | 1/2013 | Sanneck et al. | |
| 2015/0269368 A1 | 9/2015 | Sakai | |
| 2016/0373268 A1 | 12/2016 | Matsuoka | |
| 2017/0099612 A1* | 4/2017 | Salot | H04L 45/745 |
| 2019/0251241 A1* | 8/2019 | Bykampadi | H04W 12/009 |
| 2019/0253262 A1 | 8/2019 | Smith et al. | |
| 2019/0253894 A1* | 8/2019 | Bykampadi | H04L 67/51 |
| 2019/0260803 A1* | 8/2019 | Bykampadi | H04W 12/10 |
| 2020/0036754 A1* | 1/2020 | Livanos | H04W 48/16 |
| 2020/0344604 A1* | 10/2020 | He | H04W 12/088 |
| 2021/0014680 A1* | 1/2021 | Saarinen | H04W 12/106 |
| 2021/0176769 A1* | 6/2021 | Chou | H04W 72/542 |
| 2021/0203643 A1* | 7/2021 | Jost | H04W 12/02 |
| 2022/0015150 A1* | 1/2022 | Ye | H04W 74/0833 |
| 2022/0159465 A1* | 5/2022 | Shrestha | H04W 12/0431 |
| 2022/0200966 A1* | 6/2022 | de-Gregorio-Rodriguez | H04L 63/0281 |
| 2023/0007475 A1* | 1/2023 | He | H04W 12/06 |

FOREIGN PATENT DOCUMENTS

| | | |
|---|---|---|
| JP | 2015-176546 A | 10/2015 |
| JP | 2017-011487 A | 1/2017 |
| JP | 2019-536329 A | 12/2019 |
| WO | 2011/055486 A1 | 5/2011 |
| WO | 2020/208033 A1 | 10/2020 |

OTHER PUBLICATIONS

International Search Report for corresponding International Application No. PCT/JP2020/004063, mailed Apr. 21, 2020 (5 pages).
Written Opinion for corresponding International Application No. PCT/JP2020/004063, mailed Apr. 21, 2020 (3 pages).
3GPP TS 23.501 V15.4.0; "3rd Generation Partnership Project; Technical Specification Group Services and System Aspects; System Architecture for the 5G System; Stage 2 (Release 15)"; Dec. 2018 (236 pages).
Extended European Search Report issued in counterpart European Patent Application No. 20787473.6, mailed on Dec. 5, 2022 (9 pages).
China Mobile; "Living Document: Security of Service Based Architecture of 5G phase 1"; 3GPP TSG SA WG3 (Security) Meeting #91 BIS, S3-181812; La Jolla (US) May 21-25, 2018 (23 pages).
Office Action issued in Chinese Patent Application No. 202080024688.0, mailed on Feb. 8, 2024 (17 pages).
China Mobile; "Living Document: Security of Service Based Architecture of 5G phase 1"; 3GPP TSG SA WG3 (Security) Meeting #91, S3-181474; Belgrade (RS), Apr. 16-20, 2018 (23 pages).
Office Action issued in counterpart Indian Patent Application No. 202117049389 mailed on May 31, 2024 (6 pages).

* cited by examiner

NETWORK NODE

TECHNICAL FIELD

The present invention relates to a network node in a communication system.

BACKGROUND ART

In 3GPP (3rd Generation Partnership Project), a wireless communication system referred to as NR (New Radio) or 5G (hereinafter this wireless communication system will be referred to as "5G" or "NR") has been studied to increase system capacity, increase data transmission speed, and reduce delay in radio sections, and the like. In 5G, various wireless technologies are being studied in order to satisfy the requirement that the delay of the radio section be 1 ms or less while achieving a throughput of 10 Gbps or more.

In NR, a network architecture including a 5GC (5G Core Network) corresponding to an EPC (Evolved Packet Core), which is a core network in a network architecture of LTE (Long Term Evolution), and an NG-RAN (Next Generation-Radio Access Network) corresponding to an E-UTRAN (Evolved Universal Terrestrial Radio Access Network), which is a RAN (Radio Access Network) in the network architecture of LTE, has been discussed (for example, NPL 1).

PRIOR ART DOCUMENT

Non-Patent Document

Non-Patent Document 1: 3GPP TS 23.501 V15.4.0 (2018 December)

SUMMARY OF THE INVENTION

Problem to be Solved by the Invention

In a system including a network architecture of 5G, an NF (Network Function) is defined as a combination of mono-functional NF services. In a case where security or authentication is required for communication between the NF services, the security or authentication is achieved by an element in the NF in the first version (Release 15), but in the second version (Release 16), an idea of extracting the element out of the NF to form a basic function commonly used by NF services has been discussed. When a PLMN (Public Land Mobile Network) based on the first version and a PLMN based on the second version are mutually connected, it has been difficult to establish a secure communication between NF services.

The present invention has been made in view of the above points, and it is an object of the present invention to perform communication between network nodes with improved security.

Means for Solving Problem

According to the technique of the present disclosure, provided is a network node including a receiving unit configured to receive, from a management node, information for improving security of communication between network nodes, and a control unit configured to receive a request transmitted from a first network node arranged in a first PLMN (Public Land Mobile Network) based on the information for improving security, and transmit the request to a second network node arranged in a second PLMN.

Effect of the Invention

According to the technique of the present disclosure, communication can be performed between network nodes with improved security.

MODE FOR CARRYING OUT THE INVENTION

An embodiment of the present invention will be hereinafter described with reference to drawings. The embodiment described below is an example, and the embodiment to which the present invention is applied is not limited to the following embodiment.

In operation of a wireless communication system according to the embodiment of the present invention, existing techniques are used as appropriate. However, although an example of existing technique includes an existing LTE, the existing technique is not limited to the existing LTE. In addition, the term "LTE" used in this specification has a broad meaning including LTE-Advanced, specifications newer than LTE-Advanced (e.g., NR), or wireless LAN (Local Area Network), unless otherwise specified.

In the embodiment of the present invention, "to configure" a radio parameter or the like may be that a predetermined value is configured in advance (Pre-configure), or that a radio parameter notified from a network node 10 or a user equipment 20 is configured.

Figure 1:
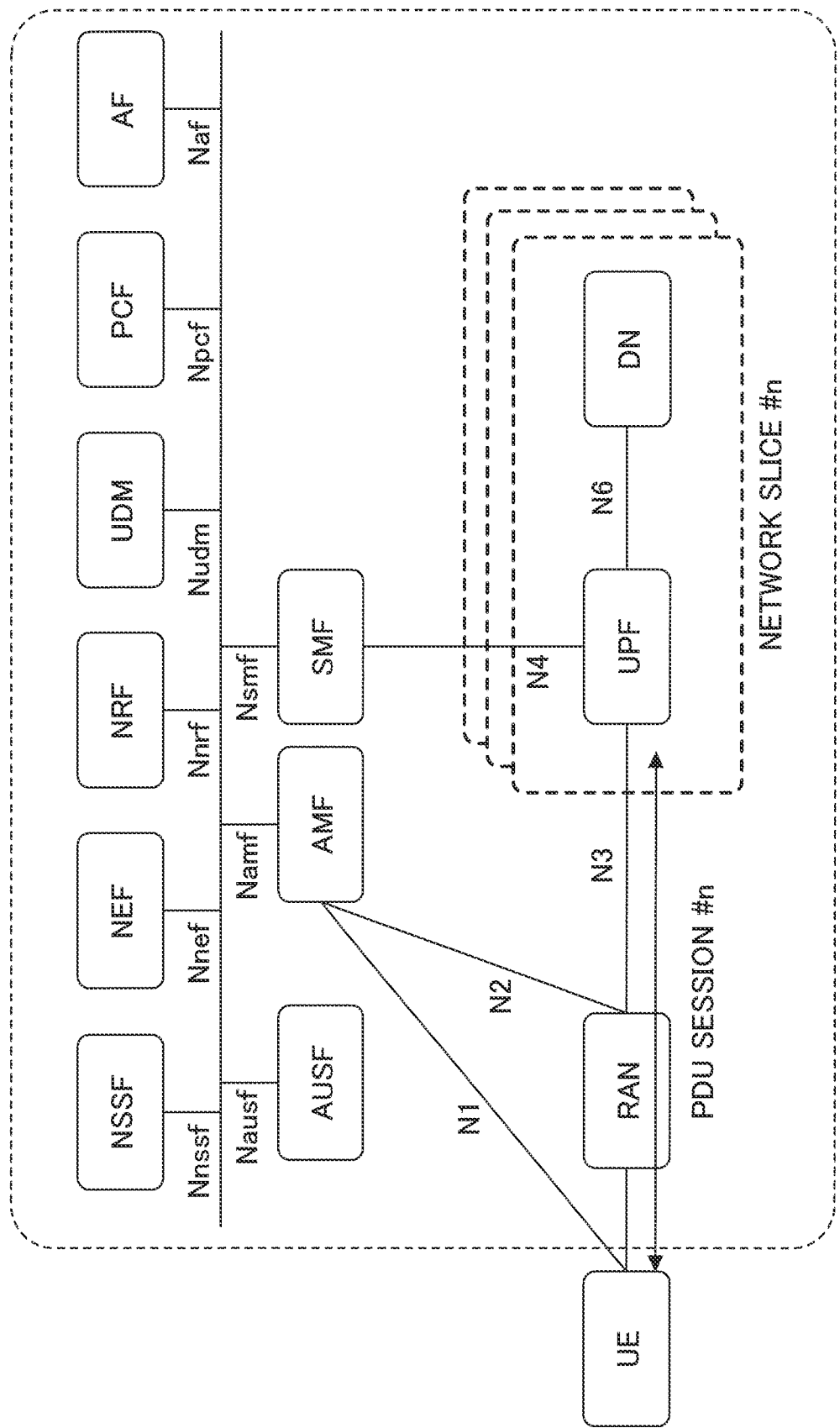
FIG. 1 is a drawing for explaining a communication system according to an embodiment of the present invention.

FIG. 1 is a figure for explaining an example of a communication system according to an embodiment of the present invention. As illustrated in FIG. 1, a communication system includes a UE, i.e., a user equipment 20, and a plurality of network nodes 10. Hereinafter, it is assumed that a network node 10 corresponds to a single function. Alternatively, multiple functions may be implemented by a single network node 10, or a plurality of network nodes 10 may implement a single function. A "connection" described below may be a logical connection or a physical connection.

A RAN (Radio Access Network) is a network node 10 having a radio access function, and is connected to a UE, an AMF (Access and Mobility Management Function), and a UPF (User plane function). The AMF is a network node 10 having functions such as a termination of RAN interface, termination of NAS (Non-Access Stratum), registration management, connection management, reachability management, mobility management, and the like. The UPF is a network node 10 having functions such as an external PDU (Protocol Data Unit) session point with for mutually connecting with a DN (Data Network), routing and forwarding of packets, QoS (Quality of Service) handling in the user plane, and the like. A UPF and a DN constitute a network slice. In the wireless communication network according to an embodiment of the present invention, a plurality of network slices are included.

The AMF is connected to the UE, the RAN, an SMF (Session Management function), an NSSF (Network Slice Selection Function), an NEF (Network Exposure Function), an NRF (Network Repository Function), an UDM (Unified Data Management), an AUSF (Authentication Server Function), a PCF (Policy Control Function), and an AF (Application Function). The AMF, the SMF, the NSSF, the NEF, the NRF, the AUSF, the PCF, and the AF are network nodes 10 mutually connected via interfaces based on their services, i.e., Namf, Nsmf, Nnssf, Nnef, Nnrf, Nudm, Nausf, Npcf, and Naf, respectively.

The SMF is a network node 10 having functions such as session management, IP (Internet Protocol) address assignment and management for the UE, DHCP (Dynamic Host Configuration Protocol) function, ARP (Address Resolution Protocol) proxy, and roaming function, and the like. The NEF is a network node 10 having a function of indicating capabilities and events to other NFs (Network Functions). The NSSF is a network node 10 having functions such as selection of a network slice to which the UE is connected, determination of Allowed NSSAI (Network Slice Selection Assistance Information), determination of the configured NSSAI, determination of an AMF set to which the UE is connected, and the like. The PCF is a network node 10 having a function of policy control of a network. The AF is a network node 10 having a function of controlling an application server. The NRF is a network node 10 having a function of discovering an NF instance providing a service.

Network nodes other than the UE, the RAN, the UPF, and the DN illustrated in FIG. 1 are included in the scope of SBA (Service Based Architecture). The SBA adopts technologies from the technical field of the Web and Cloud computing. Each NF is defined as a combination of mono-functional NF services. NFs provide and use services of each other through an integrated protocol. For example, the AMF is a stateless NF, and is separated from processes and storage provided by a UDSF (Unified Data Storage Function).

The following describes the configuration of a network related to eSBA (enhanced SBA) mainly from the viewpoint of security. In the eSBA, the following items have been discussed: NB services are to be used; the NB services themselves do not perform registration, discovery, and inter-NF communication requiring security; and open source software is used as an implementation option.

Figure 2:
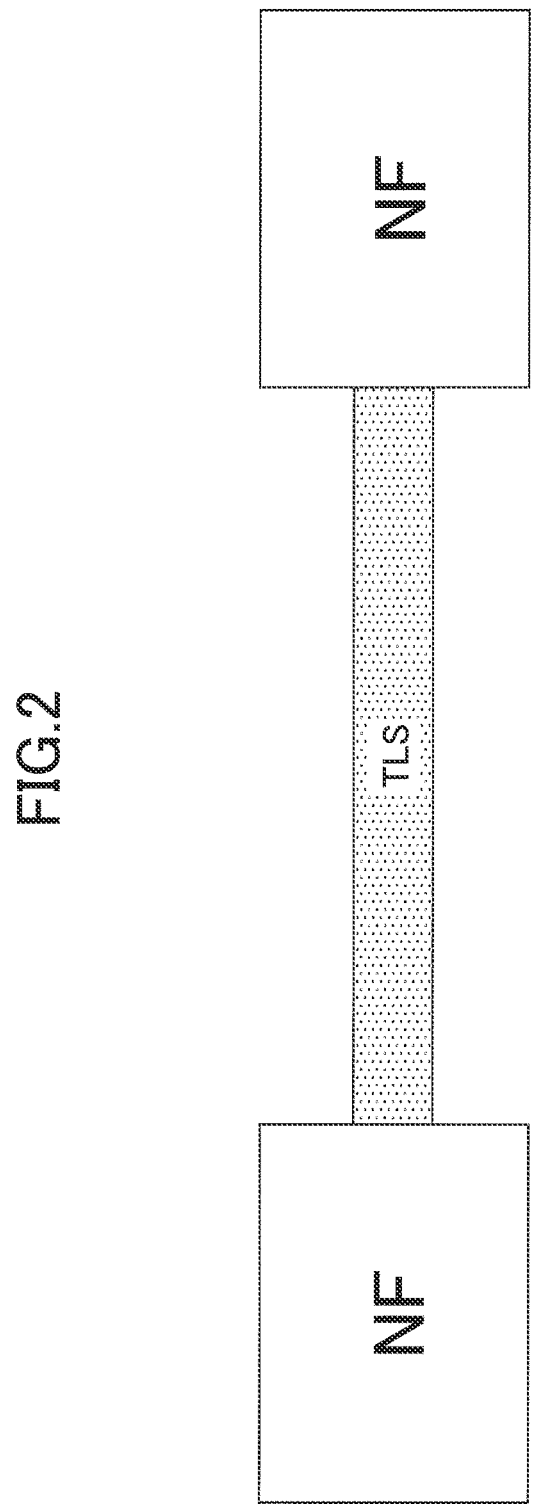
FIG. 2 is a figure for explaining an example of a mutual TLS.

FIG. 2 is a drawing for explaining an example of a mutual TLS. FIG. 2 illustrates an existing configuration in which NFs are connected via a mutual TLS (Transport Layer Security) under a non-roaming environment. TLS is a protocol used for communication requiring security in a network. In a mutual TLS, TLS authentication is performed between a server and a client in both directions. As illustrated in FIG. 2, an NF executes communication requiring security via a TLS.

Figure 3:
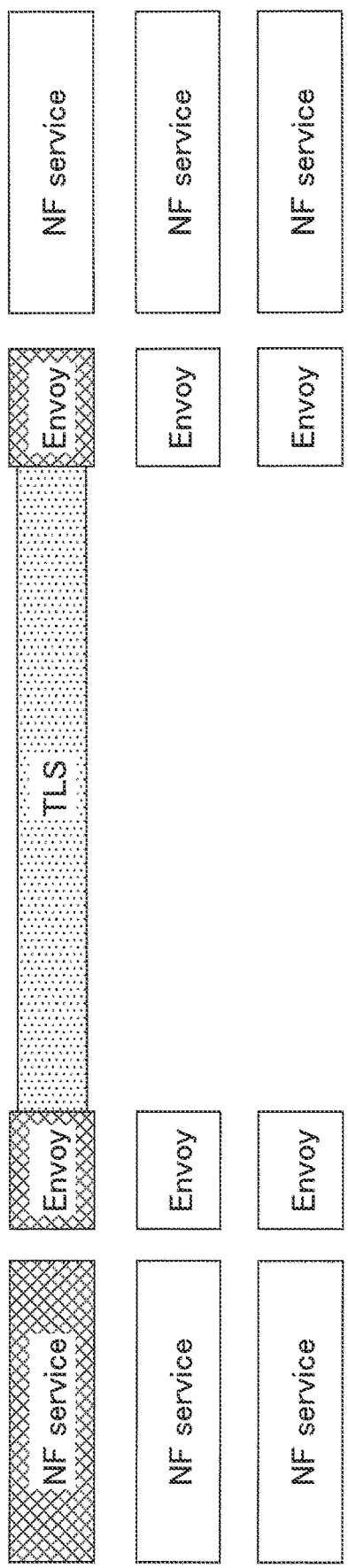
FIG. 3 is a figure for explaining an example of a mutual TLS according to an embodiment of the present invention.

FIG. 3 is a drawing for explaining an example of a mutual TLS according to an embodiment of the present invention. FIG. 3 illustrates a configuration in which NF services are connected by Envoy via mutual TLS under the non-roaming environment. The Envoy is a sidecar arranged in the same pod as an NF service. The pod is an instance of a process that runs in a containerized application. In FIG. 3, the mutual TLS is established between Envoys. The Envoy operates as a proxy for communication between NF services. Secure communication via a TLS is performed between Envoys. The Envoy can also monitor NF services.

Figure 4:
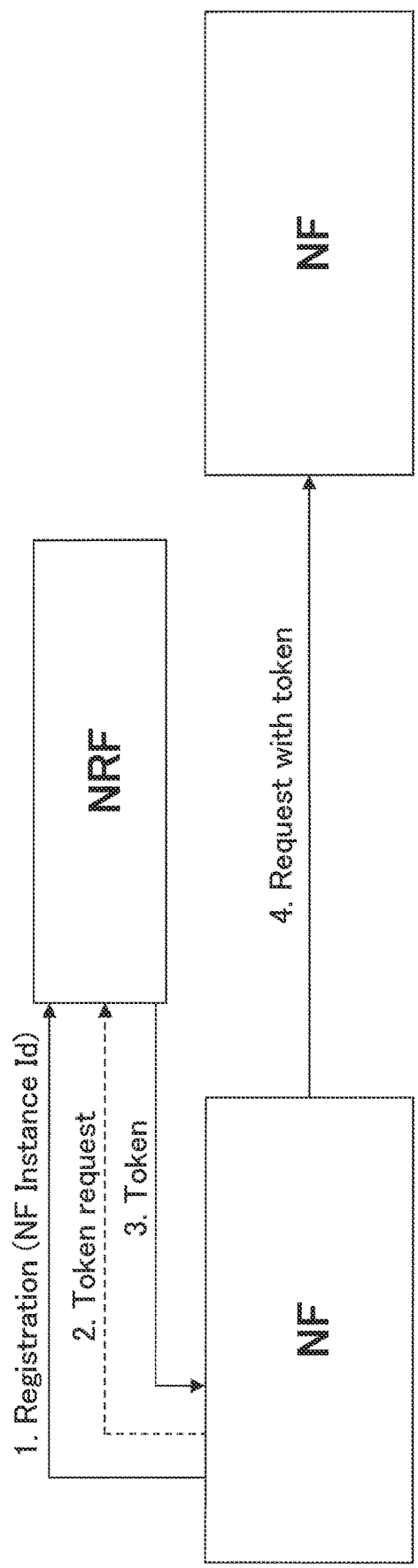
FIG. 4 is a figure for explaining an example of an authentication procedure.

FIG. 4 is a diagram for explaining an example of an authentication procedure. FIG. 4 illustrates an existing configuration in which OAuth 2.0, an open standard for authentication, runs under the non-roaming environment. An NF sends a registration including an NF instance ID to the NRF. Subsequently, the NF sends a token request to the NRF. Subsequently, the NRF sends a token to the NF. Subsequently, the NF sends a request with the token to another NF.

Figure 5:
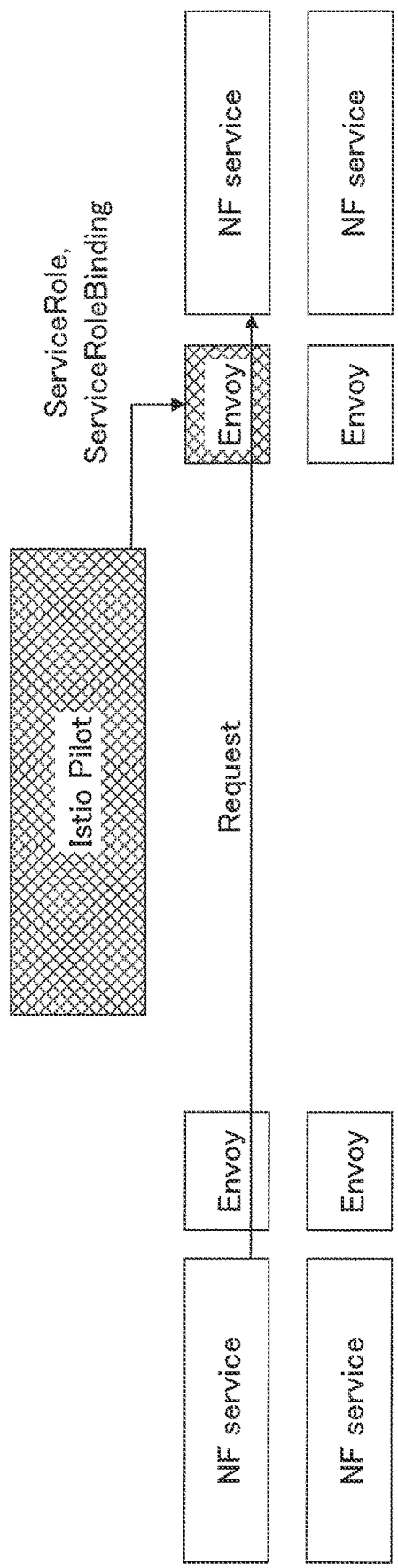
FIG. 5 is a figure for explaining an example of authentication operation according to an embodiment of the present invention.

FIG. 5 is a diagram for explaining an example of an authentication operation according to an embodiment of the present invention. FIG. 5 illustrates a configuration in which a new authentication equivalent to authentication by OAuth 2.0 is executed by an NF service under a non-roaming environment. The NF service sends a request to another NF service via an Envoy. Here, it is assumed that an Envoy of the other NF service has already obtained a service role and a service role binding from IstioPilot. The IstioPilot performs traffic policy management between Envoys, and has, for example, a policy management function and the like for load balancing. A service role provided by the IstioPilot defines an operation permitted for an NF service, and a service role binding defines which NF service is associated with a service role. By using the service role, a function of a token in OAuth as illustrated in FIG. 4 can be implemented.

Figure 6:
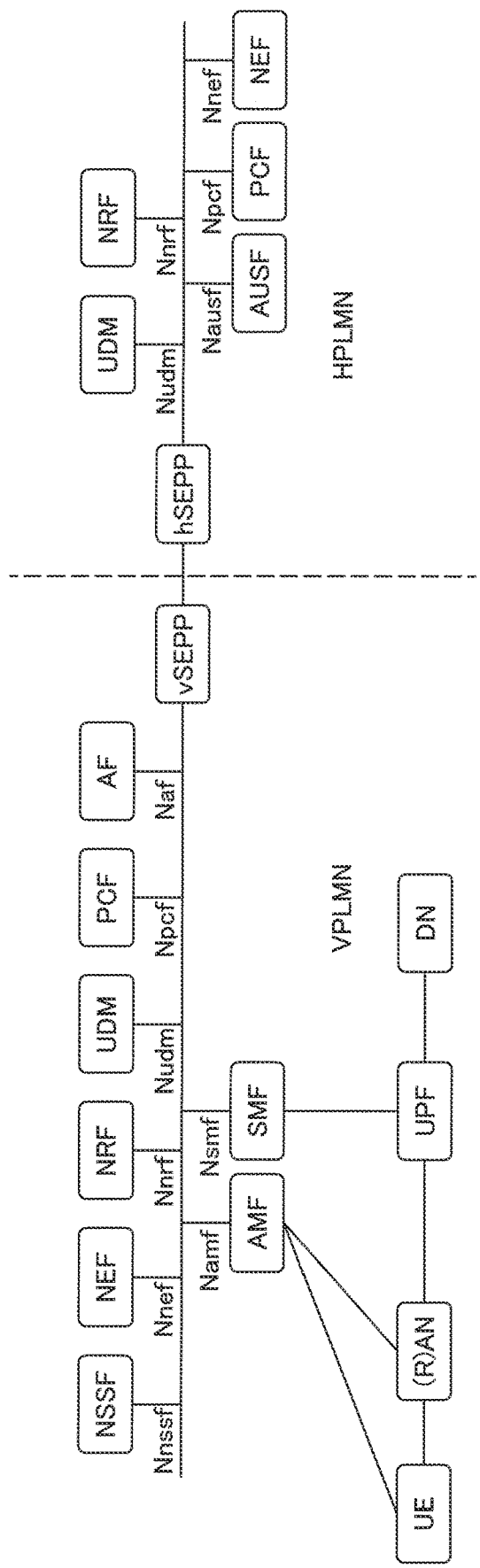
FIG. 6 is a figure for explaining an example of a communication system under a roaming environment according to an embodiment of the present invention.

FIG. 6 is a figure for explaining an example of a communication system under a roaming environment according to an embodiment of the present invention. As illustrated in FIG. 6, a network is constituted by a UE, i.e., a user equipment 20, and a plurality of network nodes 10. Hereinafter, it is assumed that a network node 10 corresponds to a single function. Alternatively, multiple functions may be implemented by a single network node 10, or a plurality of network nodes 10 may implement a single function. A "connection" described below may be a logical connection or a physical connection.

The RAN is a network node 10 having a radio access function, and is connected to the UE, the AMF, and the UPF. The AMF is a network node 10 having functions such as termination of RAN interface, termination of NAS, registration management, connection management, reachability management, mobility management, and the like. The UPF is a network node 10 having functions such as a PDU session point with the outside for mutually connecting with a DN, routing and forwarding of packets, QoS handling in the user plane, and the like. The UPF and the DN constitute a network slice. In the wireless communication network according to an embodiment of the present invention, a plurality of network slices are constructed.

The AMF is connected to the UE, RAN, SMF, NSSF, NEF, NRF, UDM, AUSF, PCF, AF, and SEPP (Security Edge Protection Proxy). The AMF, SMF, NSSF, NEF, NRF, AUSF, PCF, and AF are network nodes 10 mutually connected via interfaces based on their respective services, i.e., Namf, Nsmf, Nnssf, Nnef, Nnrf, Nudm, Nausf, Npcf, and Naf, respectively.

The SMF is a network node 10 having functions such as session management, IP address assignment and management for UE, DHCP function, ARP proxy, and roaming function, and the like. The NEF is a network node 10 having a function of exposing capabilities and events to other NFs. The NSSF is a network node 10 having functions such as selection of a network slice to which UE is connected, determination of Allowed NSSAI, determination of the configured NSSAI, determination of an AMF set to which UE is connected, and the like. The PCF is a network node 10 having a function of policy control of network. The AF is a network node 10 having a function of controlling an application server. The NRF is a network node 10 having a function of discovering an NF instance providing a service. The SEPP is a non-transparent proxy, and is configured to filter messages in the control plane between PLMNs (Public Land Mobile Networks). A vSEPP as illustrated in FIG. 6 is a SEPP in a visited network, and an hSEPP is a SEPP in a home network.

As illustrated in FIG. 6, the UE is in a roaming environment in which the UE is connected to the RAN and the AMF in a VPLMN (Visited PLMN). The VPLMN and an HPLMN (Home PLMN) are connected via the vSEPP and the hSEPP. For example, the UE can communicate with the UDM in the HPLMN via the AMF in the VPLMN.

Figure 7:
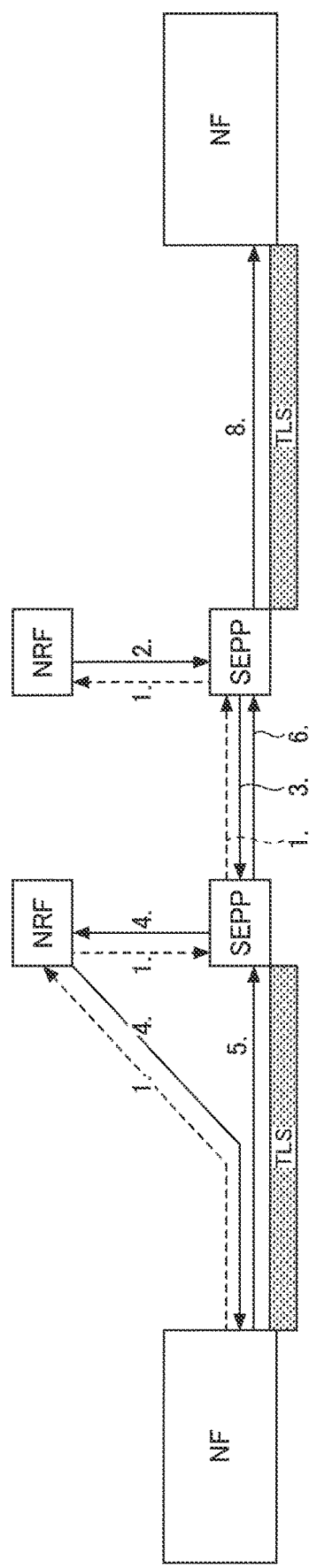
FIG. 7 is a figure for explaining an example of mutual TLSs under a roaming environment.

FIG. 7 is a drawing for explaining an example of mutual TLSs under a roaming environment. FIG. 7 illustrates a conventional configuration in which NFs are connected via mutual TLSs and SEPPs under a roaming environment. In the mutual TLS, TLS authentication is performed between a server and a client in both directions. As illustrated in FIG. 7, the NFs perform communication requiring security via TLSs and SEPPs. In FIG. 7, it is assumed that an NF transmitting a request of step 1 exists in the VPLMN, and an NF receiving a request of step 8 exists in the HPLMN.

In step 1, the NF in the VPLMN sends a request to discover a target NF service to the NRF in the VPLMN. The NRF in the VPLMN sends a request to the NRF in the HPLMN via SEPPs in the VPLMN and the HPLMN. Subsequently, in step 2, the NRF in the HPLMN sends an actual FQDN (Fully Qualified Domain Name) of the target NF to the SEPP in the HPLMN. Subsequently, in step 3, the SEPP in the HPLMN sends a disguised FQDN of the target NF to the SEPP in the VPLMN. Subsequently, in step 4, the SEPP in the VPLMN sends a telescopic FQDN via the NRF in the VPLMN to the NF in the VPLMN. The telescopic FQDN is an FQDN, a domain of SEPP being added at the end of the FQDN.

In step 5, the NF in the VPLMN sends a request with the telescopic FQDN to the SEPP in the VPLMN via the TLS between the NF in the VPLMN and the SEPP in the VPLMN. Subsequently, in step 6, the SEPP in the VPLMN sends a request with the disguised FQDN to the SEPP in the HPLMN. Subsequently, in step 8, the SEPP in the HPLMN sends a request with the actual FQDN to the NF in the HPLMN via the TLS between the NF and the SEPP.

Figure 8:
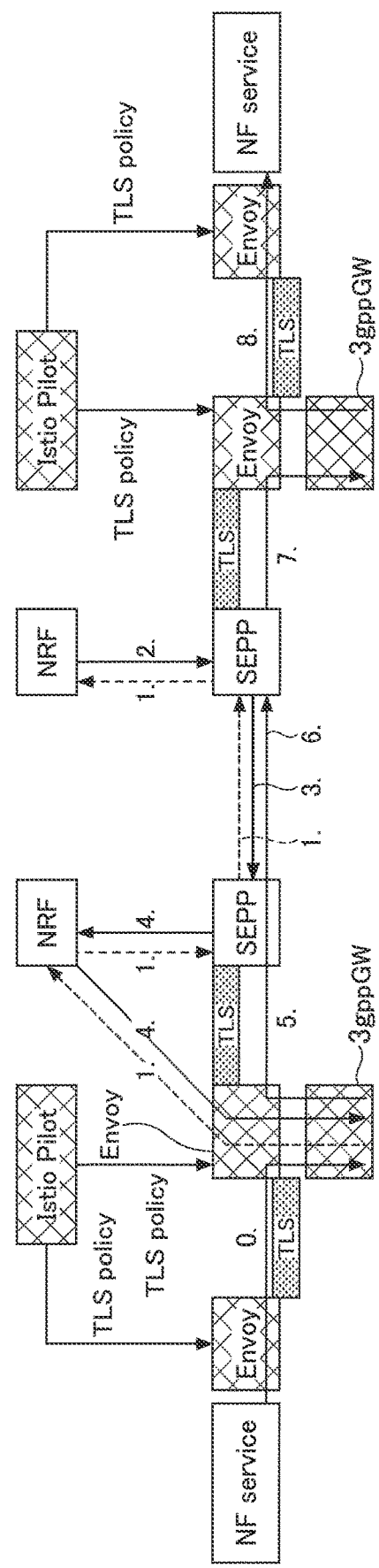
FIG. 8 is a figure for explaining an example (1) of mutual TLSs under a roaming environment according to an embodiment of the present invention.

FIG. 8 is a drawing for explaining an example (1) of mutual TLSs under a roaming environment according to an embodiment of the present invention. FIG. 8 illustrates a configuration in which NF services are connected by Envoys via mutual TLSs under a roaming environment. In FIG. 8, mutual TLSs are established by Envoys. In FIG. 8, it is assumed that an NF service transmitting a request of step 0 exists in the VPLMN, and an NF service receiving a request of step 8 exists in the HPLMN. It should be noted that an NF service and an Envoy may constitute a single network node operating in the same pod. Also, a 3gppGW and an Envoy may constitute a single network node operating in the same pod.

As illustrated in FIG. 8, in each of the VPLMN and the HPLMN, IstioPilot supplies TLS policies to Envoys. With TLS policies, a TLS can be established between Envoys or between an Envoy and a SEPP. It should be noted that, for authentication, a TLS is divided into a TLS between an Envoy and an Envoy and a TLS between an Envoy and a SEPP.

In step 0, the NF service in the VPLMN sends a request to the 3gppGW in the VPLMN via the TLS between Envoys. Subsequently, the 3gppGW transforms information for finding the destination NF service included in the HTTP header into a GET query string. In step 1, the 3gppGW in the VPLMN sends a request to the NRF in the HPLMN via an Envoy, the NRF in the VPLMN, and the SEPPs in the VPLMN and the HPLMN. Subsequently, in step 2, the NRF in the HPLMN sends an actual FQDN of the target NF service to the SEPP in the HPLMN. Subsequently, in step 3, the SEPP in the HPLMN sends a disguised FQDN of the target NF service to the SEPP in the VPLMN. Subsequently, in step 4, the SEPP in the VPLMN sends a telescopic FQDN via the NRF in the VPLMN to the 3gppGW in the VPLMN.

In step 5, the 3gppGW in the VPLMN sends a request with the telescopic FQDN to the SEPP in the VPLMN via the TLS between the Envoy and the SEPP. Subsequently, in step 6, the SEPP in the VPLMN sends a request with the disguised FQDN to the SEPP in the HPLMN. Subsequently, in step 7, the SEPP in the HPLMN sends a request with the actual FQDN to the 3gppGW in the HPLMN via the TLS between the SEPP and the Envoy. Subsequently, in step 8, the 3gppGW in the HPLMN sends a request with the actual FQDN to the NF service in the HPLMN via the TLS between Envoys.

Figure 9:
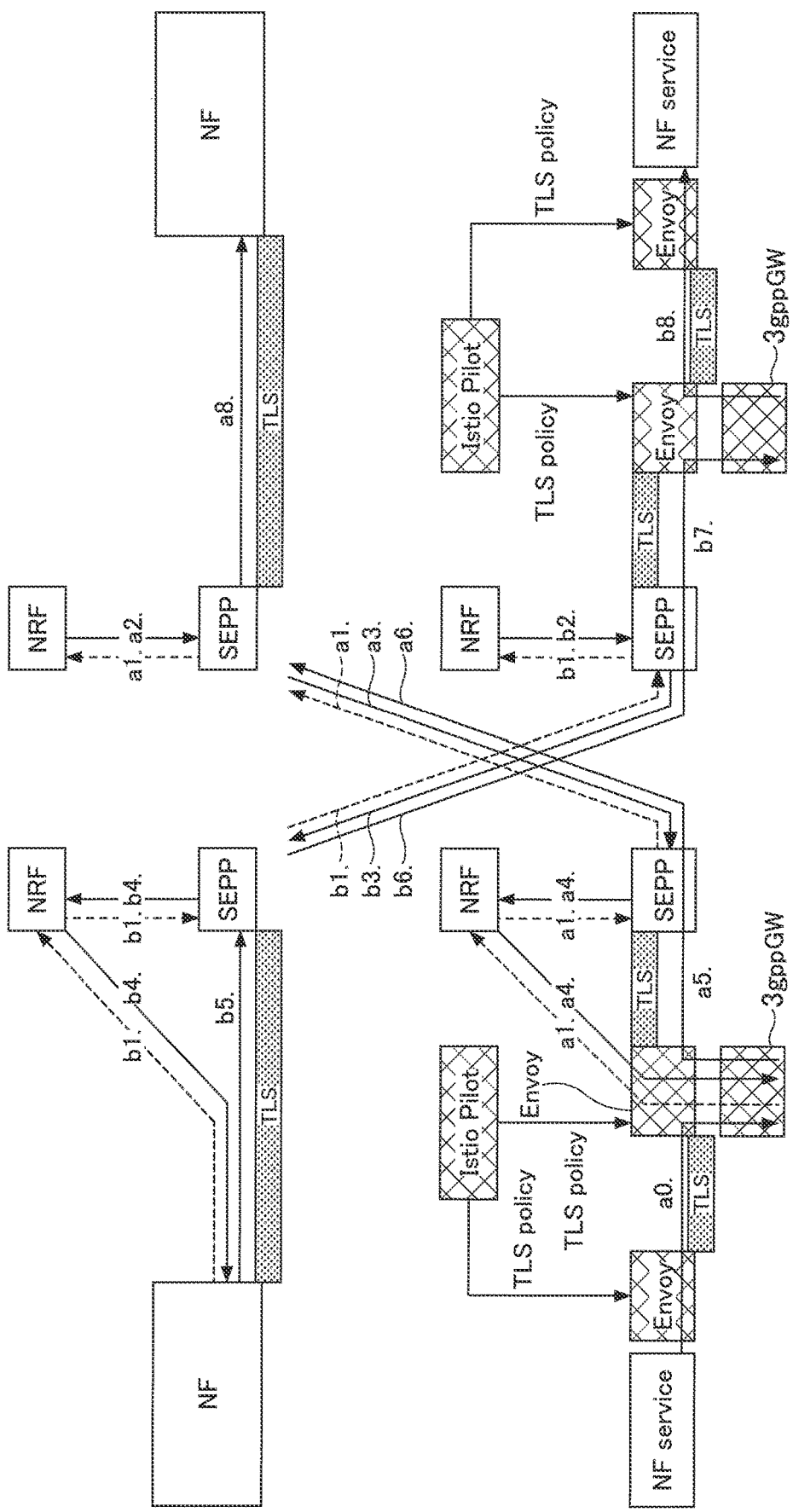
FIG. 9 is a figure for explaining an example (2) of mutual TLSs under a roaming environment according to an embodiment of the present invention.

FIG. 9 is a drawing for explaining an example (2) of mutual TLSs under a roaming environment according to an embodiment of the present invention. FIG. 9 illustrates an example where, under a roaming environment, a configuration in which an NF service is connected by an Envoy via a mutual TLS and an existing configuration in which an NF is connected via a mutual TLS connection and a SEPP are different between the VPLMN and the HPLMN. More specifically, FIG. 9 illustrates a sequence from step a0 to step a8 in which a request is transmitted from an NF service in the VPLMN to an NF in the HPLMN and a sequence from step b1 to step b8 in which a request is transmitted from an NF in the VPLMN to an NF service in the HPLMN. It should be noted that an NF service and an Envoy may constitute a single network node operating in the same pod. Also, a 3gppGW and an Envoy may constitute a single network node operating in the same pod.

In step a0, the NF service in the VPLMN sends a request for discovering the target NF service to the 3gppGW in the VPLMN via the TLS between Envoys. Subsequently, the 3gppGW transforms information for finding the destination NF service included in the HTTP header into a GET query string. In step a1, the 3gppGW in the VPLMN sends a request to the NRF in the HPLMN via Envoy, the NRF in the VPLMN, and SEPPs in the VPLMN and the HPLMN. Subsequently, in step a2, the NRF in the HPLMN sends an actual FQDN of the target NF to the SEPP in the HPLMN. Subsequently, in step a3, the SEPP in the HPLMN sends a disguised FQDN of the target NF to the SEPP in the VPLMN. Subsequently, in step a4, the SEPP in the VPLMN sends a telescopic FQDN to the 3gppGW in the VPLMN via the NRF in the VPLMN.

In step a5, the 3gppGW in the VPLMN sends a request with the telescopic FQDN to the SEPP in the VPLMN via the TLS between the Envoy and the SEPP. Subsequently, in step a6, the SEPP in the VPLMN sends a request with the disguised FQDN to the SEPP in the HPLMN. Subsequently, in step a8, the SEPP in the HPLMN sends a request with an actual FQDN to the NF in the HPLMN via the TLS between the SEPP and the NF.

In contrast, in step b1, an NF in the VPLMN sends a request for discovering a target NF service to an NRF in the VPLMN. The NRF in the VPLMN sends a request to an NRF in the HPLMN via the SEPPs in the VPLMN and the HPLMN. Subsequently, in step b2, the NRF in the HPLMN sends the actual FQDN of the target NF service to the SEPP in the HPLMN. Subsequently, in step b3, the SEPP in the HPLMN sends a disguised FQDN of the target NF service to the SEPP in the VPLMN. Subsequently, in step b4, the SEPP in the VPLMN sends a telescopic FQDN to the 3gppGW in the VPLMN via the NRF in the VPLMN.

In step b5, the NF in the VPLMN sends a request with the telescopic FQDN to the SEPP in the VPLMN via the TLS between the NF and the SEPP. Subsequently, in step b6, the SEPP in the VPLMN sends a request with the disguised FQDN to the SEPP in the HPLMN. Subsequently, in step b7, the SEPP in the HPLMN sends a request with the actual FQDN to the 3gppGW in the HPLMN via the TLS between the SEPP and the Envoy. Subsequently, in step b8, the 3gppGW in the HPLMN sends a request with the actual FQDN to the NF service in the HPLMN via the TLS between Envoys.

Figure 10:
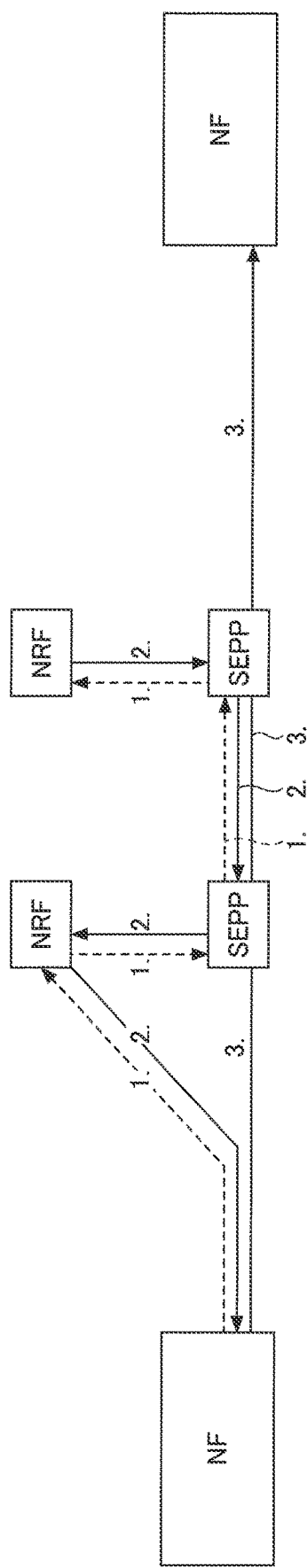
FIG. 10 is a figure for explaining an example of an authentication procedure under a roaming environment.

FIG. 10 is a drawing for explaining an example of an authentication procedure under a roaming environment. FIG. 10 illustrates an existing configuration in which OAuth 2.0, an open standard for authentication, runs under a roaming environment. In FIG. 10, it is assumed that an NF transmitting a token request of step 1 exists in the VPLMN, and an NF receiving a request of step 3 exists in the HPLMN.

In step 1, the NF in the VPLMN sends a token request to the NRF in the VPLMN. Subsequently, the NRF in the VPLMN sends a token request to the SEPP in the VPLMN. Subsequently, the SEPP in the VPLMN sends a token request to a SEPP in the HPLMN. Subsequently, the SEPP in the HPLMN sends a token request to the NRF in the HPLMN. Subsequently, in step 2, the NRF in the HPLMN sends a token to the NRF in the VPLMN via the SEPPs in the HPLMN and the VPLMN. The NRF in the VPLMN sends a token to the NF in the VPLMN. Subsequently, in step 3, the NF in the VPLMN sends a request with the token to the NF in the HPLMN via the SEPPs in the VPLMN and the HPLMN.

Figure 11:
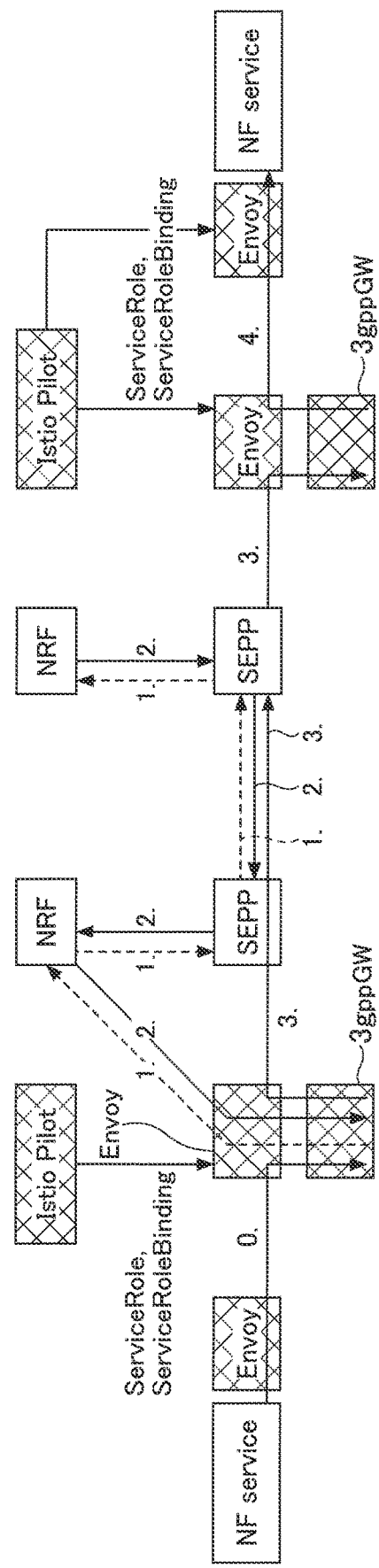
FIG. 11 is a figure for explaining an example (1) of the authentication procedure under a roaming environment according to an embodiment of the present invention.

FIG. 11 is a drawing for explaining an example (1) of an authentication procedure under a roaming environment according to an embodiment of the present invention. FIG. 11 illustrates a configuration in which a new authentication corresponding to authentication by OAuth 2.0 is executed from an NF service in the VPLMN under a roaming environment. The NF service in the VPLMN sends a request to an NF service in HPLMN via Envoys. Herein, it is assumed that Envoys arranged in the VPLMN and the HPLMN have obtained a service role and service role binding from Istio-Pilot. By using the service role, the function of the token in OAuth as illustrated in FIG. 10 can be implemented. It should be noted that an NF service and an Envoy may constitute a single network node operating in the same pod. Also, a 3gppGW and an Envoy may constitute a single network node operating in the same pod.

In step 0, the NF service in the VPLMN sends a request to the 3gppGW in the VPLMN via Envoy. Based on the received request, the 3gppGW in the VPLMN generates a token request, acting as if the 3gppGW is a consumer NF. Subsequently, in step 1, the 3gppGW in the VPLMN sends the token request to the NRF in the VPLMN via Envoy. Subsequently, the NRF in the VPLMN sends the token request to the NRF in the HPLMN via SEPPs in the VPLMN and the HPLMN.

In step 2, the NRF in the HPLMN sends a pre-configured token for accessing a 3gppGW in the HPLMN to the SEPP in the HPLMN. Subsequently, the SEPP in the HPLMN sends the token to the SEPP in the VPLMN. Subsequently, the SEPP in the VPLMN sends the token to the NRF in the VPLMN. The NRF in the VPLMN sends the token to the 3gppGW in the VPLMN via Envoy. In step 3, the 3gppGW in the VPLMN sends a request with the generated token to the 3gppGW in the HPLMN via Envoys and SEPPs. The 3gppGW in the HPLMN discards the token. Subsequently, in step 4, the 3gppGW in the HPLMN sends the received request to the NF service in the HPLMN via Envoy.

Figure 12:
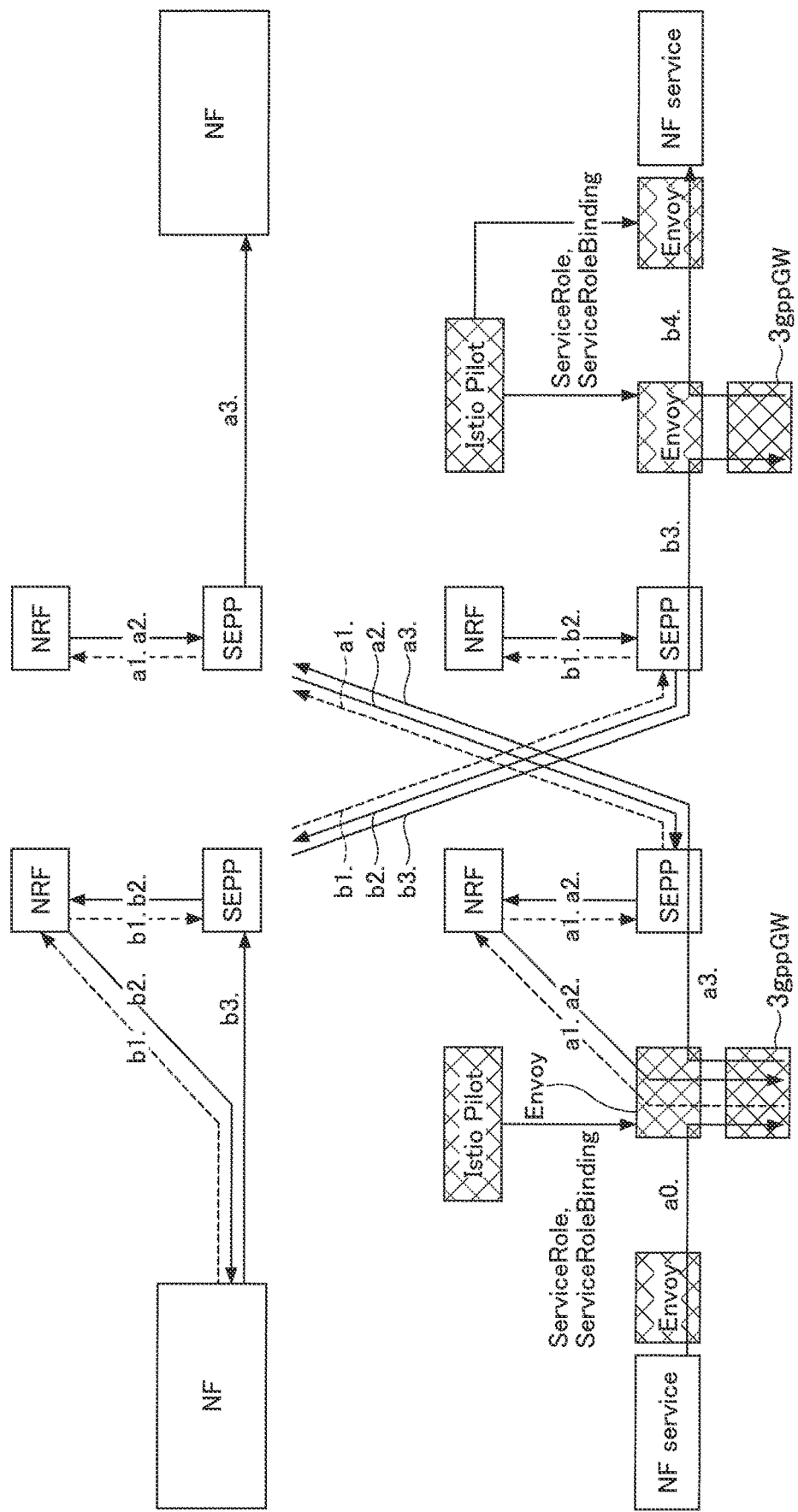
FIG. 12 is a figure for explaining an example (2) of the authentication procedure under a roaming environment according to an embodiment of the present invention.

FIG. 12 is a drawing for explaining an example (2) of an authentication procedure under a roaming environment according to an embodiment of the present invention. FIG. 12 illustrates an example where, under a roaming environment, the VPLMN and the HPLMN are different from each other with respect to a configuration in which new authentication corresponding to authentication by OAuth 2.0 is executed from an NF service in the VPLMN and an existing configuration in which OAuth 2.0 is executed. More specifically, FIG. 12 illustrates a sequence from step a0 to step a3 in which a request is transmitted from an NF service in the VPLMN to an NF in the HPLMN and a sequence from step b1 to step b4 in which a request is transmitted from an NF in the VPLMN to an NF service in the HPLMN. It should be noted that an NF service and an Envoy may constitute a single network node operating in the same pod. Also, a 3gppGW and an Envoy may constitute a single network node operating in the same pod.

In step a0, the NF service in the VPLMN sends a request to the 3gppGW in the VPLMN via Envoy. Based on the received request, the 3gppGW in the VPLMN generates a token request, acting as if the 3gppGW is a consumer NF. Subsequently, in step a1, the 3gppGW in the VPLMN sends the token request to the NRF in the VPLMN via Envoy.

Subsequently, the NRF in the VPLMN sends the token request to the NRF in the HPLMN via SEPPs in the VPLMN and the HPLMN.

In step a2, the NRF in the HPLMN sends a token to the NRF in the VPLMN via the SEPPs in the HPLMN and the VPLMN. The NRF in the VPLMN sends the token to the 3gppGW in the VPLMN via Envoy. Subsequently, in step a3, the 3gppGW in the VPLMN sends a request with the token to the NF in the HPLMN via Envoy, the SEPP in the VPLMN, and the SEPP in the HPLMN.

In contrast, in step b1, an NF in the VPLMN sends a token request to an NRF in the VPLMN. Subsequently, the NRF in the VPLMN sends the token request to a SEPP in the VPLMN. Subsequently, the SEPP in the VPLMN sends the token request to a SEPP in the HPLMN. Subsequently, the SEPP in the HPLMN sends the token request to an NRF in the HPLMN. Subsequently, in step b2, the NRF in the HPLMN sends a pre-configured token for accessing the 3gppGW to the NRF in the VPLMN via the SEPPs in the HPLMN and the VPLMN. The NRF in the VPLMN sends the token to the NF in the VPLMN. Subsequently, in step b3, the NF in the VPLMN sends a request with the token to the 3gppGW in the HPLMN via the SEPPs in the VPLMN and the HPLMN and via Envoy. The 3gppGW in the HPLMN discards the received token. Subsequently, in step b4, the 3gppGW in the HPLMN sends the received request to the NF service in the HPLMN via Envoys.

According to the above embodiment, an NF service, i.e., a network node 10, can perform secure communication with another NF service by establishing a mutual TLS between Envoys. Furthermore, an NF service, i.e., a network node 10, can execute authentication via Envoys with a service role and a service role binding provided by IstioPilot. Still furthermore, even when the VPLMN and the HPLMN include, in a mixed manner, a network configuration including an NF and a network configuration including an NF service using an Envoy as a proxy, an NF service, i.e., a network node 10, can perform secure communication by establishing a TLS and can execute authentication via Envoys by a service role and a service role binding provided by IstioPilot.

More specifically, communication with improved security can be executed between network nodes.

Apparatus Configuration

Next, an example of a functional configuration of the network node 10 and the user equipment 20 that execute the processing and operations described so far will be described. The network node 10 and the user equipment 20 include a function for implementing the above-described embodiments explained above. However, each of the network node 10 and the user equipment 20 may have only some of the functions of the embodiment.

Network Node 10

Figure 13:
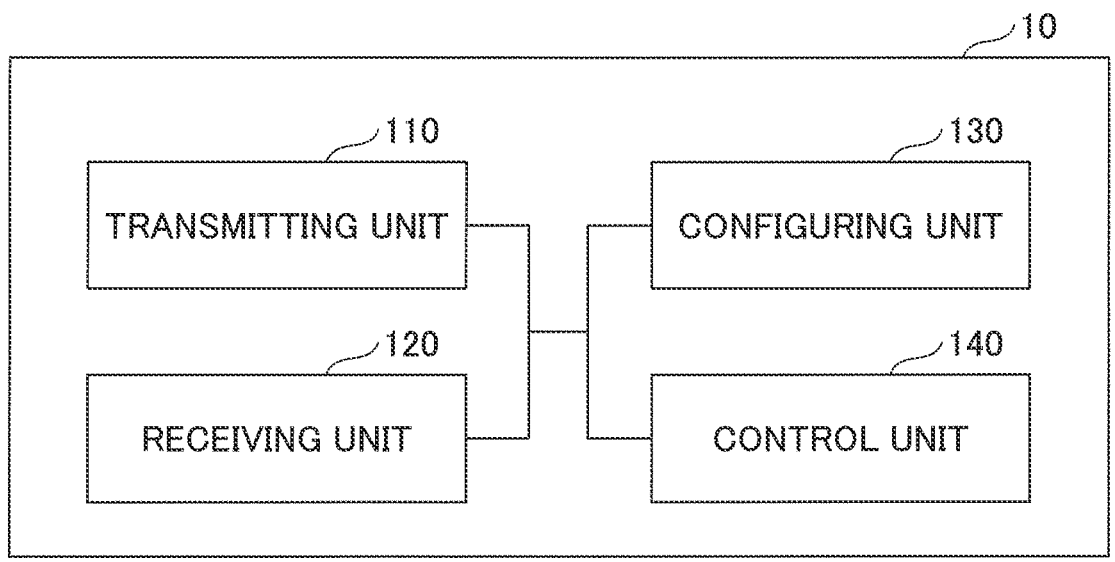
FIG. 13 is a drawing illustrating an example of the functional configuration of a network node 10 according to an embodiment of the present invention.

FIG. 13 is a drawing illustrating an example of a functional configuration of a network node 10. As illustrated in FIG. 13, the network node 10 includes a transmitting unit 110, a receiving unit 120, a configuring unit 130, and a control unit 140. The functional configuration illustrated in FIG. 13 is merely an example. As long as the operation according to the embodiment of the present invention can be executed, the functions may be divided in any way, and the functional units may be given any names. Also, a network node 10 having different functions in the system architecture may be constituted by a plurality of network nodes 10 separated according to the functions.

The transmitting unit 110 includes a function of generating signals to be transmitted to the user equipment 20 or another network node 10 and transmitting the signals through wires or wirelessly. The receiving unit 120 includes a function of receiving various types of signals transmitted from the user equipment 20 or another network node 10 and acquiring, for example, information on a higher layer from the received signals.

The configuring unit 130 stores configuration information configured in advance and various configuration information to be transmitted to the user equipment 20 in a storage device and reads out the configuration information from the storage device as needed. The contents of the configuration information are, for example, information about security or authentication between NF services.

As explained in the embodiment, the control unit 140 performs processing related to security or authentication between NF services. Also, the control unit 140 performs processing related to communication with the user equipment 20. A functional unit for transmitting signals in the control unit 140 may be included in the transmitting unit 110, and a functional unit for receiving signals in the control unit 140 may be included in the receiving unit 120.

User Equipment 20

Figure 14:
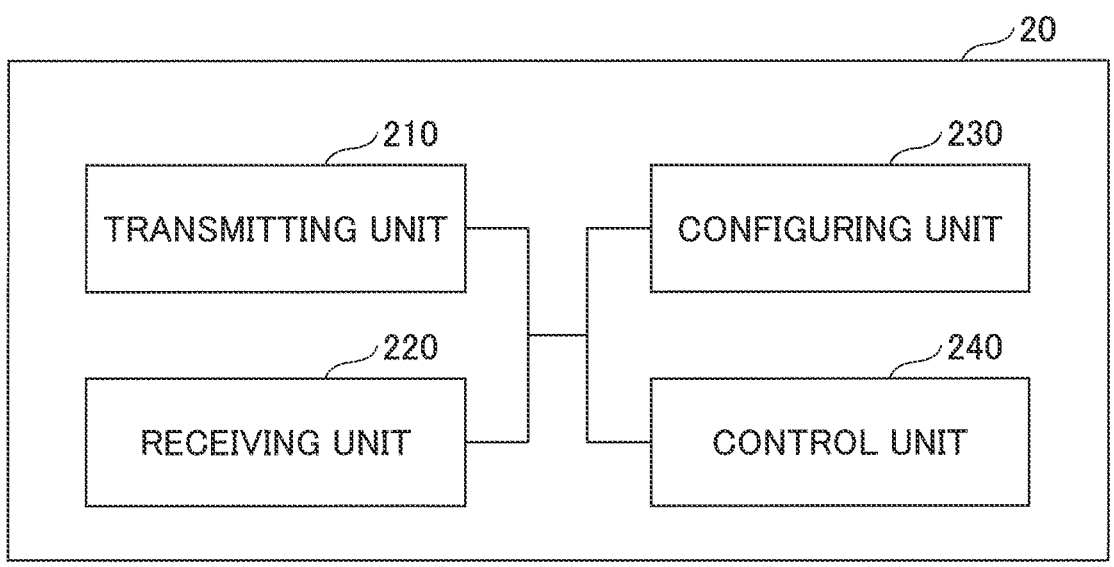
FIG. 14 is a drawing illustrating an example of the functional configuration of a user equipment 20 according to an embodiment of the present invention.

FIG. 14 is a drawing illustrating an example of a functional configuration of the user equipment 20. As illustrated in FIG. 14, the user equipment 20 includes a transmitting unit 210, a receiving unit 220, a configuring unit 230, and a control unit 240. The functional configuration illustrated in FIG. 14 is merely an example. As long as the operation according to the embodiment of the present invention can be executed, the functions may be divided in any way, and the functional units may be given any names.

The transmitting unit 210 generates a transmission signal from transmission data and wirelessly transmits the transmission signal. The receiving unit 220 wirelessly receives various types of signals, and acquires a signal in a higher-layer from the received signal in the physical layer. Also, the receiving unit 220 has a function of receiving NR-PSS, NR-SSS, NR-PBCH, DL/UL control signals, reference signals, or the like, transmitted from the network node 10.

The configuring unit 230 stores in a storage device various types of configuration information received from the base station apparatus 10 by the receiving unit 220 and reads out the configuration information from the storage device as needed. The configuring unit 230 also stores configuration information configured in advance. The contents of the configuration information are, for example, information about network slices with which connections are allowed to be made.

As explained in the embodiment and the like, the control unit 240 performs processing related to connection control with networks and network slices. A functional unit for transmitting signals in the control unit 240 may be included in the transmitting unit 210, and a functional unit for receiving signals in the control unit 240 may be included in the receiving unit 220.

Hardware Configuration

The block diagrams (FIGS. 13 and 14) used for explaining the above embodiment illustrate blocks in units of functions. These functional blocks (constituent units) are implemented by any combination of at least one of hardware and software. In this regard, the method for implementing the various functional blocks is not particularly limited. That is, each functional block may be implemented by one device united physically and logically. Alternatively, each functional block may be implemented by connecting directly or indirectly (for example, in a wired or wireless manner) two or more devices that are physically or logically separated and connected together and using these multiple devices. The functional block may be implemented by combining software with the single device or multiple devices.

Functions include, but are not limited to, determining, calculating, processing, deriving, investigating, searching, confirming, receiving, transmitting, outputting, accessing, resolving, selecting, establishing, comparing, assuming, expecting, considering, broadcasting, notifying, communicating, forwarding, configuring, reconfiguring, allocating, mapping, assigning, and the like. For example, a functional block (constituting unit) that has a function of transmitting is referred to as a transmitting unit and a transmitter. As described above, a method for implementing these functions is not particularly limited.

Figure 15:
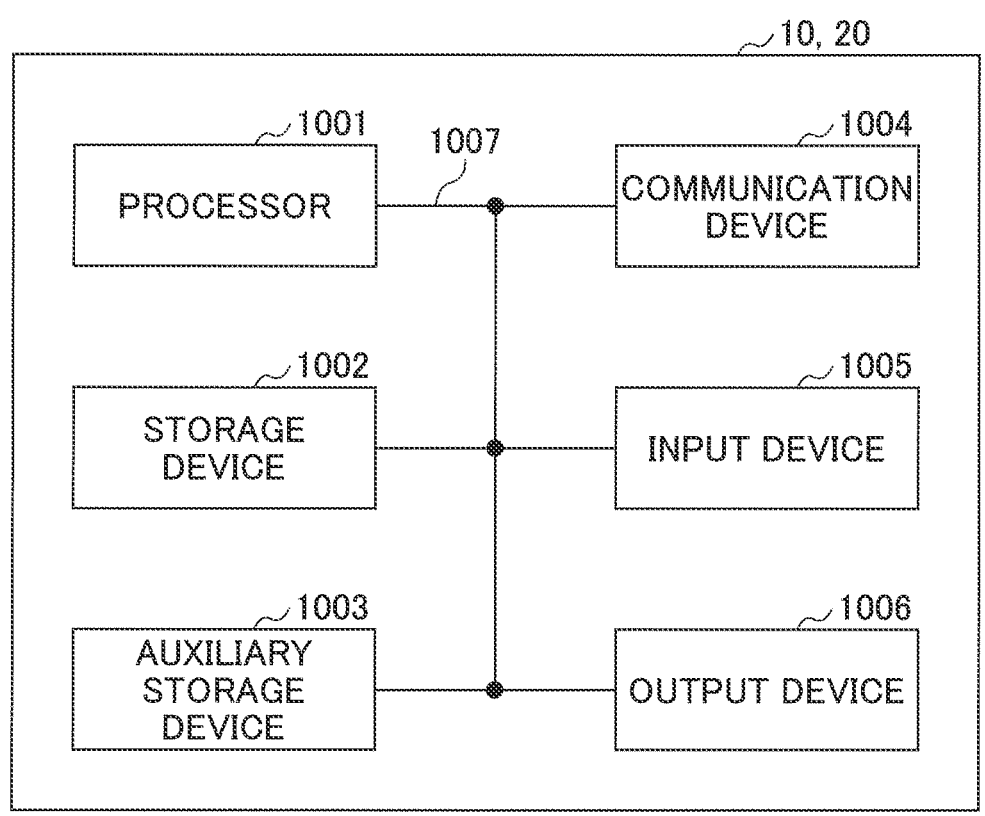
FIG. 15 is a drawing illustrating an example of the hardware configuration of a network node 10 or a user equipment 20 according to an embodiment of the present invention.

For example, the network node 10, the user equipment 20, and the like according to one embodiment of the present disclosure may function as a computer that performs processing of a wireless communication according to the present disclosure. FIG. 15 is a drawing illustrating an example of a hardware configuration of the network node 10 or the user equipment 20 according to an embodiment of the present disclosure. Each of the network node 10 and user equipment 20 may be physically configured as a computer device including a processor 1001, a storage device 1002, an auxiliary storage device 1003, a communication device 1004, an input device 1005, an output device 1006, a bus 1007, and the like.

It is noted that, in the following description, the term "device" may be read as a circuit, an apparatus, a unit, or the like. The hardware configurations of the network node 10 and the user equipment 20 may be configured to include one or more of the devices illustrated in drawings, or may be configured not to include some of the devices.

Each function of the network node 10 and the user equipment 20 may be implemented by reading predetermined software (program) to hardware such as the processor 1001, the storage device 1002, or the like, causing the processor 1001 to perform operations, controlling communication by the communication device 1004, and controlling at least one of reading and writing of data in the storage device 1002 and the auxiliary storage device 1003.

The processor 1001 executes, for example, an operating system to control the overall operation of the computer. The processor 1001 may be a central processing unit (CPU) including an interface with peripheral devices, a control device, an arithmetic device, a register, and the like. For example, the control unit 140, the control unit 240, and the like described above may be implemented by the processor 1001.

The processor 1001 reads a program (program code), a software module, or data from at least one of the auxiliary storage device 1003 and the communication device 1004 onto the storage device 1002, and performs various processes according to the program, the software module, or the data. As the program, a program that causes a computer to perform at least some of the operations described in the embodiment explained above is used. For example, the control unit 140 of the network node 10, as illustrated in FIG. 13, may be implemented by a control program that is stored in the storage device 1002 and that is executed by the processor 1001. Also, for example, the control unit 240 of the user equipment 20, as illustrated in FIG. 14, may be implemented by a control program that is stored in the storage device 1002 and that is executed by the processor 1001. Explanation has been provided above for the case in which the above various processing are performed by the single processor 1001. However, such processing may be simultaneously or sequentially performed by two or more processors 1001. The processor 1001 may be implemented with one or more chips. It is noted that the program may be transmitted from a network through an electronic communication line.

The storage device 1002 is a computer-readable recording medium and may be constituted by at least one of, for example, a ROM (Read Only Memory), an EPROM (Erasable Programmable ROM), an EEPROM (Electrically Erasable Programmable ROM), a RAM (Random Access Memory), and the like. The storage device 1002 may also be referred to as a register, a cache, a main memory (main storage device), or the like. The storage device 1002 can store a program (program code), a software module and the like that can be executed to perform a communication method according to an embodiment of the present disclosure.

The auxiliary storage device 1003 is a computer-readable recording medium and may be configured by at least one of, for example, an optical disk such as a CD-ROM (Compact Disc ROM), a hard disk drive, a flexible disk, a magneto-optical disk (for example, a compact disk, a digital versatile disk, or a Blu-ray (registered trademark) disk), a smart card, a flash memory (for example, a card, a stick, or a key drive), a floppy (registered trademark) disk, a magnetic strip, and the like. The above storage medium may be, for example, a database, a server, or other appropriate media including at least one of the storage device 1002 and the auxiliary storage device 1003.

The communication device 1004 is hardware (a transmission and reception device) for performing communication between computers through at least one of wired and wireless networks and may also be referred to as, for example, a network device, a network controller, a network card, a communication module, or the like. The communication device 1004 may include, for example, a radio frequency switch, a duplexer, a filter, a frequency synthesizer, or the like to implement at least one of a frequency division duplex (FDD) and a time division duplex (TDD). For example, a transmission and reception antenna, an amplifier, a transmitting and receiving unit, a transmission line interface, and the like may be implemented by the communication device 1004. The transmitting and receiving unit may be implemented in such a manner that a transmitting unit and a receiving unit are physically or logically separated.

The input device 1005 is an input device (for example, a keyboard, a mouse, a microphone, a switch, a button, a sensor, or the like) that receives an input from the outside. The output device 1006 is an output device (for example, a display, a speaker, an LED lamp, or the like) that performs an output to the outside. It is noted that the input device 1005 and the output device 1006 may be integrated with each other (for example, a touch panel).

The devices, such as the processor 1001 and the storage device 1002, are connected to each other via a bus 1007 for communicating information. The bus 1007 may be constituted by using a single bus, or may be constituted by using busses different depending on devices.

The base station apparatus 10 and the user equipment 20 may include hardware, such as a microprocessor, a digital signal processor (DSP), an ASIC (Application Specific Integrated Circuit), a PLD (Programmable Logic Device), or an FPGA (Field Programmable Gate Array), or alternatively, some or all of the functional blocks may be implemented by the hardware. For example, the processor 1001 may be implemented with at least one of these hardware components.

Summary of Embodiment

As described above, according to the embodiment of the present invention, provided is a network node including a receiving unit configured to receive, from a management node, information for improving security of communication between network nodes, and a control unit configured to receive a request transmitted from a first network node arranged in a first PLMN (Public Land Mobile Network) based on the information for improving security, and transmit the request to a second network node arranged in a second PLMN.

According to the above configuration, an NF service, i.e., a network node 10, can perform secure communication with another NF service by establishing a mutual TLS between Envoys. The NF service, i.e., the network node 10, can execute authentication via Envoys with a service role and a service role binding provided by IstioPilot. Even when the VPLMN and the HPLMN include, in a mixed manner, a network configuration including an NF and a network configuration including an NF service using an Envoy as a proxy, the NF service or an NF, i.e., a network node 10, can perform secure communication by establishing a TLS and can execute authentication via Envoys by a service role and a service role binding provided by IstioPilot. More specifically, communication with improved security can be executed between network nodes.

The first PLMN may be a VPLMN (Visited PLMN), and the second PLMN may be an HPLMN (Home PLMN), and at least one of the first network node and the second network node may be an NF (Network Function) service. According to this configuration, under a roaming environment, communication with improved security can be executed between network nodes.

The first network node may be an NF service and the second network node may be an NF, or the first network node may be an NF and the second network node may be an NF service. According to this configuration, under a roaming environment, even in a case where the configuration of a network is different between an NF and an NF service, communication with improved security can be executed between network nodes.

The information for improving security may be a TLS (Transport Layer Security) policy, and the control unit may establish a first mutual TLS with the first network node, establish a second mutual TLS with a SEPP (Security Edge Protection Proxy) in the first PLMN, receive the request via the established first mutual TLS, and transmit the request via the established second mutual TLS. According to this configuration, under a roaming environment, communication with improved security can be executed by the mutual TLS between network nodes.

The information for improving security may be a service role and a service role binding, and the control unit may achieve a function of acquiring and using a token for transmitting the request to the second network node, based on the service role and the service role binding. According to this configuration, communication with improved security can be executed between network nodes via Envoys implementing the function of the token.

Supplements to Embodiment

The embodiment of the present invention has been described above, but the disclosed invention is not limited to the above embodiment, and those skilled in the art would understand that various modified examples, revised examples, alternative examples, substitution examples, and the like can be made. In order to facilitate understanding of the present invention, specific numerical value examples are used for explanation, but the numerical values are merely examples, and any suitable values may be used unless otherwise stated. Classifications of items in the above description are not essential to the present invention, contents described in two or more items may be used in combination if necessary, and contents described in an item may be applied to contents described in another item (unless a contradiction arises). The boundaries between the functional units or the processing units in the functional block diagrams do not necessarily correspond to the boundaries of physical components. Operations of a plurality of functional units may be physically implemented by a single component and an operation of a single functional unit may be physically implemented by a plurality of components. Concerning the processing procedures described above in the embodiment, the orders of steps may be changed unless a contradiction arises. For the sake of convenience for describing the processing, the network node 10 and the user equipment 20 have been described with the use of the functional block diagrams, but these apparatuses may be implemented by hardware, software, or a combination thereof. Each of software functioning with a processor of the network node 10 according to the embodiment of the present invention and software functioning with a processor of the user equipment 20 according to the embodiment of the present invention may be stored in a random access memory (RAM), a flash memory, a read-only memory (ROM), an EPROM, an EEPROM, a register, a hard disk (HDD), a removable disk, a CD-ROM, a database, a server, or any suitable recording media.

Also, the notification of information is not limited to the aspect or embodiment described in the present disclosure, but may be performed by other methods. For example, the notification of information may be performed by physical layer signaling (for example, DCI (Downlink Control Information), UCI (Uplink Control Information)), higher layer signaling (for example, RRC (Radio Resource Control) signaling, MAC (Medium Access Control) signaling, broadcast information (an MIB (Master Information Block) and an SIB (System Information Block)), other signals, or combinations thereof. The RRC signaling may be also be referred to as an RRC message and may be, for example, an RRC connection setup message, an RRC connection reconfiguration message, or the like.

Each aspect and embodiment described in the present disclosure may be applied to at least one of a system that uses a suitable system such as LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (New Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), or Bluetooth (registered trademark), and a next-generation system expanded on the basis thereof. Also a plurality of systems may be combined and applied (for example, a combination of at least one of LTE and LTE-A with 5G, and the like).

In the operation procedures, sequences, flowcharts, and the like according to each aspect and embodiment described in the present disclosure, the orders of steps may be changed unless a contradiction arises. For example, in the methods described in the present disclosure, elements of various steps are illustrated by using an exemplary order and the methods are not limited to the specific orders presented.

The specific operations performed by the network node 10 described in the present disclosure may in some cases be performed by an upper node. It is clear that, in a network that includes one or more network nodes including the network node 10, various operations performed for communication with the user equipment 20 can be performed by at least one of the network node 10 and another network node other than the network node 10 (for example, a MME, a S-GW, or the like may be mentioned, but not limited thereto). In the above, the description has been made for the case where another network node other than the network node 10 is a single node as an example. But the another network node may be a combination of a plurality of other network nodes (for example, a MME and a S-GW).

Information, signals, or the like described in the present disclosure may be output from a higher layer (or a lower layer) to a lower layer (or a higher layer). Information, signals, or the like described in the present disclosure may be input and output via a plurality of network nodes.

Information or the like that has been input or output may be stored at a predetermined place (for example, a memory) and may be managed with the use of a management table. Information or the like that is input or output can be overwritten, updated, or appended. Information or the like that has been output may be deleted. Information or the like that has been input may be transmitted to another apparatus.

In the present disclosure, determination may be made with the use of a value expressed by one bit (0 or 1), may be made with the use of a Boolean value (true or false), and may be made through a comparison of numerical values (for example, a comparison with a predetermined value).

Regardless of whether software is referred to as software, firmware, middleware, microcode, a hardware description language, or another name, software should be interpreted broadly to mean instructions, instruction sets, codes, code segments, program codes, a program, a sub-program, a software module, an application, a software application, a software package, a routine, a subroutine, an object, an executable file, an execution thread, a procedure, a function, and the like.

Software, instructions, information, or the like may be transmitted and received through transmission media. For example, in a case where software is transmitted from a website, a server or another remote source through at least one of wired technology (such as a coaxial cable, an optical-fiber cable, a twisted pair, or a digital subscriber line (DSL)) and radio technology (such as infrared or microwaves), at least one of the wired technology and the radio technology is included in the definition of a transmission medium.

Information, signals, and the like described in the present disclosure may be expressed with the use of any one of various different technologies. For example, data, instructions, commands, information, signals, bits, symbols, chips, and the like mentioned herein throughout the above explanation may be expressed by voltages, currents, electromagnetic waves, magnetic fields or magnetic particles, optical fields or photons, or any combinations thereof.

The terms described in the present disclosure and the terms necessary for understanding the present disclosure may be replaced with terms having the same or similar meanings. For example, at least one of a channel and a symbol may be a signal (signaling). A signal may be a message. A component carrier (CC) may be referred to as a carrier frequency, a cell, a frequency carrier, or the like.

The terms "system" and "network" used in the present disclosure are used interchangeably.

Information, parameters, and the like described in the present disclosure may be expressed by absolute values, may be expressed by relative values with respect to predetermined values, and may be expressed by corresponding different information. For example, radio resources may be indicated by indexes.

The above-described names used for the parameters are not restrictive in any respect. In addition, formulas or the like using these parameters may be different from those explicitly disclosed in the present disclosure. Various channels (for example, a PUCCH, a PDCCH, and the like) and information elements can be identified by any suitable names, and therefore, various names given to these various channels and information elements are not restrictive in any respect.

In the present disclosure, terms such as "base station (BS)", "radio base station", "base station apparatus", "fixed station", "NodeB", "eNodeB (eNB)", "gNodeB (gNB)", "access point", "transmission point", "reception point", "transmission/reception point", "cell", "sector", "cell group", "carrier", "component carrier", and the like may be used interchangeably. A base station may be referred to as a macro-cell, a small cell, a femtocell, a pico-cell, or the like.

A base station can accommodate one or a plurality of (for example, three) cells (that may be called sectors). In a case where a base station accommodates a plurality of cells, the whole coverage area of the base station can be divided into a plurality of smaller areas. For each smaller area, a base station subsystem (for example, an indoor miniature base station RRH (Remote Radio Head)) can provide a communication service. The term "cell" or "sector" denotes all or a part of the coverage area of at least one of a base station and a base station subsystem that provides communication services in the coverage.

In the present disclosure, terms such as "mobile station (MS)", "user terminal", "user equipment (UE)", and "terminal" may be used interchangeably.

By the person skilled in the art, a mobile station may be referred to as any one of a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, and other suitable terms.

At least one of a base station and a mobile station may be referred to as a transmitting apparatus, a receiving apparatus, a communication apparatus, or the like. At least one of a base station and a mobile station may be an apparatus mounted on a mobile body, or may be a mobile body itself, or the like. A mobile body may be a transporting device (e.g., a vehicle, an airplane, and the like), an unmanned mobile (e.g., a drone, an automated vehicle, and the like), or a robot (of a manned or unmanned type). It is noted that at least one of a base station and a mobile station includes an apparatus that does not necessarily move during a communication operation. For example, at least one of a base station and a mobile station may be an IoT (Internet of Thing) device such as a sensor.

In addition, a base station according to the present disclosure may be read as a user terminal. For example, each aspect or embodiment of the present disclosure may be applied to a configuration in which communication between a base station and a user terminal is replaced by communication between a plurality of user equipments 20 (that may be called D2D (Device-to-Device), V2X (Vehicle-to-Everything), or the like). In this case, a user equipment 20 may have above-described functions of the network node 10. In this regard, a word such as "up" or "down" may be read as a word corresponding to communication between terminals (for example, "side"). For example, an uplink channel, a downlink channel, or the like may be read as a side channel.

Similarly, a user terminal according to the present disclosure may be replaced with a base station apparatus. In this case, a base station may have above-described functions of the user terminal.

The term "determine" used herein may mean various operations. For example, judging, calculating, computing, processing, deriving, investigating, looking up, searching, inquiring (for example, looking up a table, a database, or another data structure), ascertaining, or the like may be deemed as making determination. Also, receiving (for example, receiving information), transmitting (for example, transmitting information), inputting, outputting, or accessing (for example, accessing data in a memory), or the like may be deemed as making determination. Also, resolving, selecting, choosing, establishing, comparing, or the like may be deemed as making determination. That is, doing a certain operation may be deemed as making determination. "To determine" may be read as "to assume", "to expect", "to consider", or the like.

Each of the terms "connected" and "coupled" and any variations thereof mean any connection or coupling among two or more elements directly or indirectly and can mean that one or a plurality of intermediate elements are inserted among two or more elements that are "connected" or "coupled" together. Coupling or connecting among elements may be physical one, may be logical one, and may be a combination thereof. For example, "connecting" may be read as "accessing". In a case where the terms "connected" and "coupled" and any variations thereof are used in the present disclosure, it may be considered that two elements are "connected" or "coupled" together with the use of at least one type of a medium from among one or a plurality of wires, cables, and printed conductive traces, and in addition, as some non-limiting and non-inclusive examples, it may be considered that two elements are "connected" or "coupled" together with the use of electromagnetic energy such as electromagnetic energy having a wavelength of the radio frequency range, the microwave range, or the light range (including both of the visible light range and the invisible light range).

A reference signal can be abbreviated as an RS (Reference Signal). A reference signal may be referred to as a pilot depending on an applied standard.

A term "based on" used in the present disclosure does not mean "based on only" unless otherwise specifically noted. In other words, a term "base on" means both "based on only" and "based on at least".

Any references to elements denoted by a name including terms such as "first" or "second" used in the present disclosure do not generally limit the amount or the order of these elements. These terms can be used in the present disclosure as a convenient method for distinguishing one or a plurality of elements. Therefore, references to first and second elements do not mean that only the two elements can be employed or that the first element should be, in some way, prior to the second element.

"Means" in each of the above apparatuses may be replaced with "unit", "circuit", "device", or the like.

In a case where any one of "include", "including", and variations thereof is used in the present disclosure, each of these terms is intended to be inclusive in the same way as the term "comprising". Further, the term "or" used in the present disclosure is intended to be not exclusive-or.

Throughout the present disclosure, in a case where an article such as "a", "an", or "the" in English is added through a translation, the present disclosure may include a case where a noun following such article is of a plural forms.

Throughout the present disclosure, an expression that "A and B are different" may mean that "A and B are different from each other". Also this term may mean that "each of A and B is different from C". Terms such as "separate" and "coupled" may also be interpreted in a manner similar to "different".

Each aspect or embodiment described in the present disclosure may be solely used, may be used in combination with another embodiment, and may be used in a manner of being switched with another embodiment upon implementation. Notification of predetermined information (for example, notification of "being x") may be implemented not only explicitly but also implicitly (for example, by not notifying predetermined information).

It should be noted that NF, NF service, NRF, SEPP, 3gppGW, IstioPilot, or Envoy in the present disclosure, and a combination thereof are examples of a network node. IstioPilot is an example of a management node.

Although the present disclosure has been described above, it will be understood by those skilled in the art that the present disclosure is not limited to the embodiment described in the present disclosure. Modifications and changes of the present disclosure may be possible without departing from the subject matter and the scope of the present disclosure defined by claims. Therefore, the descriptions of the present disclosure are for illustrative purposes only, and are not intended to be limiting the present disclosure in any way.

This international patent application claims the priority based on Japanese Patent Application No. 2019-075884 filed on Apr. 11, 2019, and the entire content of Japanese Patent Application No. 2019-075884 is incorporated herein by reference.

REFERENCE SIGNS LIST

10 network node
110 transmitting unit
120 receiving unit
130 configuring unit
140 control unit
20 user equipment
210 transmitting unit
220 receiving unit
230 configuring unit
240 control unit
1001 processor
1002 storage device
1003 auxiliary storage device
1004 communication device

1005 input device
1006 output device

The invention claimed is:

1. A network node comprising:
a processor configured to establish a mutual Transport Layer Security (TLS) with a first network node;
a receiver configured to receive a service request from the first network node via the TLS; and
a transmitter configured to transmit a token request to a second network node, based on the service request, wherein:
the receiver receives a token from the second network node, the transmitter transmits a second service request including the token, the token being received from the second network node, to a third network node, the third network node being different from the second network node,
the token is used for an authentication procedure for authenticating the first network node by the third network node, and
the second network node is configured to operate as a proxy for the first network node.

2. The network node according to claim 1, wherein the processor obtains information for finding a destination NF (Network Function) service, from an HTTP header of the service request received from the first network node.

3. The network node according to claim 1, wherein the first network node is located in a Visited Public Land Mobile Network (VPLMN), and the second network node and the third network node are located in a Home Public Land Mobile Network (HPLMN).

* * * * *

UNITED STATES PATENT AND TRADEMARK OFFICE
CERTIFICATE OF CORRECTION

PATENT NO. : 12,075,251 B2
APPLICATION NO. : 17/601246
DATED : August 27, 2024
INVENTOR(S) : Atsushi Minokuchi et al.

Page 1 of 1

It is certified that error appears in the above-identified patent and that said Letters Patent is hereby corrected as shown below:

In the Claims

Column 19, Claim 1, Line 21-22, listed as "the second network node is configured to operate as a proxy for the first network node." should read – the network node is configured to operate as a proxy for the first network node. –.

Signed and Sealed this
Twenty-sixth Day of November, 2024

Katherine Kelly Vidal
*Director of the United States Patent and Trademark Office*